Jan. 26, 1954  J. FRIED  2,667,111
FOLDED CARDBOARD CAMERA WITH WINDING KNOB RETAINING MEANS
Filed Aug. 3, 1951  2 Sheets-Sheet 1
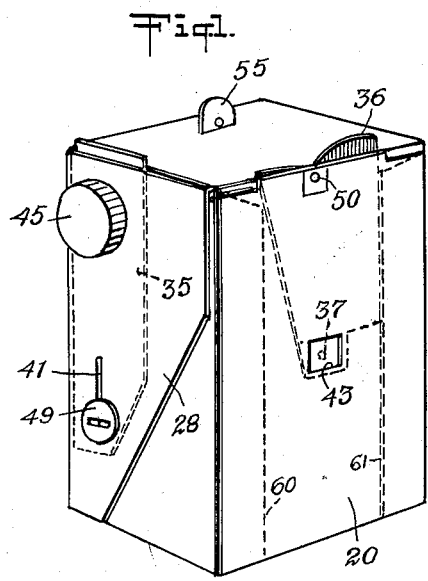
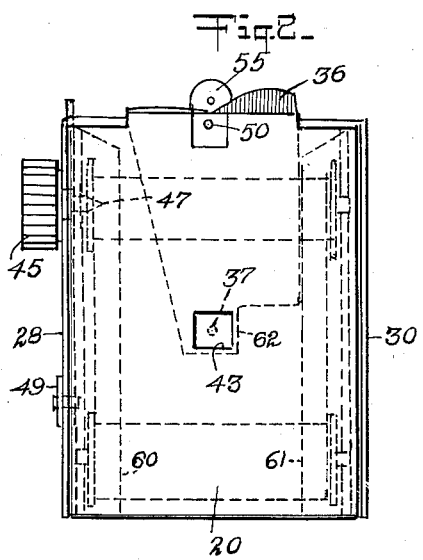
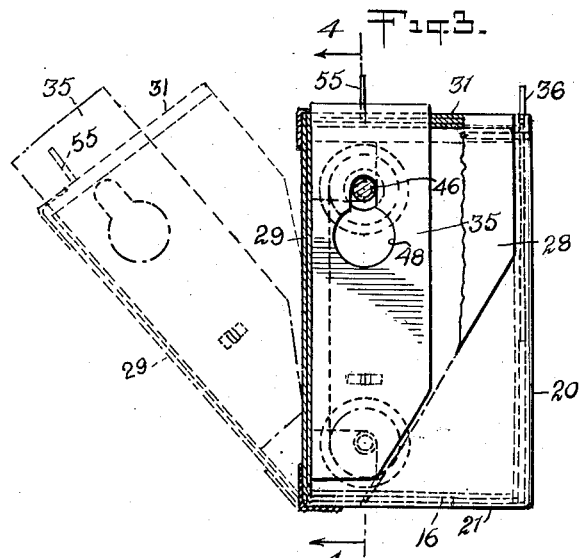
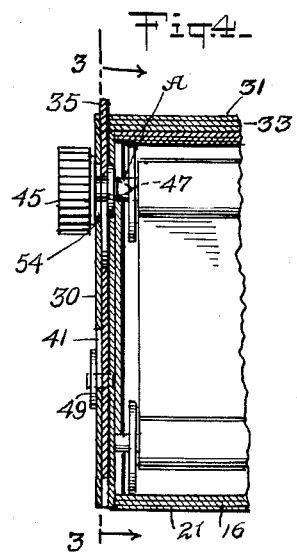
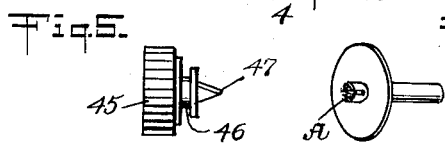
INVENTOR.
Jacob Fried

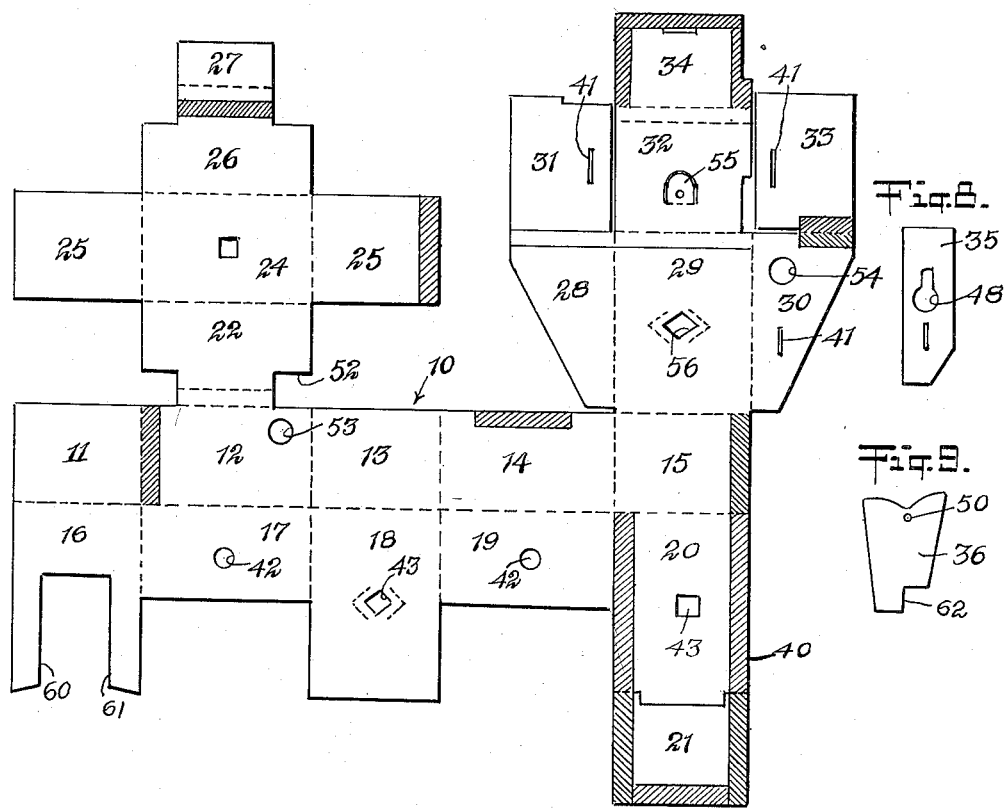

Patented Jan. 26, 1954

2,667,111

UNITED STATES PATENT OFFICE 2,667,111

FOLDED CARDBOARD CAMERA WITH WINDING KNOB RETAINING MEANS

Jacob Fried, Bronx, N. Y.

Application August 3, 1951, Serial No. 240,190

2 Claims. (Cl. 95—31)

This invention relates to cameras and more particularly to a foldable camera, the machine portion of which is made in one piece and which can be readily assembled into a workable pinhole camera. This invention is an improvement on the camera shown in my prior Patent No. 2,559,214, issued July 3, 1951, and the front portion thereof is very similar. This improvement deals mainly with the rear portion of the camera and with the spool film holding means and operating structure.

Further and more specific objects, features and advantages will more clearly appear from a consideration of the specification hereinafter set forth when taken in connection with the accompanying drawings which illustrate a further form of my camera.

Briefly, the invention comprises a blank of suitable material such as cardboard which can be die-cut in suitable form and which includes a plurality of sections, flaps and tabs joined by creased lines which when folded together and assembled form an actual operable, simple and efficient camera with a pinhole opening and an oscillatable shutter. The back of the camera is pivoted so that it may be opened to insert a regular roll of film and can be locked shut by the same means which holds the operating knob that winds the film.

In the accompanying drawings—

Fig. 1 is a perspective view of a camera embodying my invention.

Fig. 2 is a cross-sectional view showing the interior of the camera.

Fig. 3 is a sectional view taken on the line 3—3 of Fig. 4.

Fig. 4 is a sectional view taken on the line 4—4 of Fig. 3.

Fig. 5 is a detailed view of the operating key.

Fig. 6 is a detailed view of the end of a conventional reel which the key shown in Fig. 5 engages.

Fig. 7 is a plan view of the blank from which the camera is made.

Fig. 8 is a detailed view of the lock slide.

Fig. 9 is a detailed view of the shutter.

Referring more particularly to the drawings, the blank 10 is made up of a plurality of sections. Segments 11, 12, 13, 14 and 15 when folded into place form the top, bottom and the two sides of the camera. Segments 16, 17, 18, 19, 20 and 21 form the complete side of the front of the camera. Segments 22, 23, 24, 25, 26 and 27 fold into the camera to form the simple supports for the spools of a roll of film which rest on the vertical pieces 22 and 26. Segments 28, 29, 30, 31, 32, 33 and 34 form the back of the camera. When the blank 10 is folded together it may be fastened in place by means of the tape members 40 and the shutter 36 inserted in place as well as the key lock slide 35. The segments 30, 31 and 33 are provided with slots 41. Segments 17 and 19 are apertured at 42 and segments 18 and 20 at 43 so that when the front is assembled the light may pass through the pinhole entry.

The key 37 is provided with a knob portion 45, a recessed portion 46 and a roll engaging portion 47. This roll engaging portion will engage the end A of the film roll. The key slide 35 is provided with an inverted keyhole 48 with its wider portion at the bottom through which the shank of the key 37 can pass. When the key-slide is in an upward position the key may be removed and the camera opened, but when the slide is pushed downwardly the narrower portion of the keyhole opening engages the recessed portion 46 of the key 37, thus locking it in place. The movement of the slide is limited by a rivet 49 mounted in the slot 41 in the segment 30. The shutter 36 is pivoted by means of a pin through the opening 50 and is positioned behind the panel 20 to cover and uncover the opening 43.

When it is desired to use the camera the back is opened and a roll of film is inserted with the spindle engaged in the cut-out portions 52 of the segment 22. The end of the film is engaged in the conventional spindle which is positioned with one end supported by a similar shoulder 52 and the other end extending through the opening 53 in the segment 12 which when the camera is closed will register with the opening 54 in the segment 30. The key is then inserted with its inner end engaging the end of the spool and the lock-slide brought down to lock the camera shut. A tab 55 in the member 32 is bent upwardly and apertured to form a sight and a covered opening 56 is provided to register the film and to show the movement of the film in use. A small diaphragm having a pinhole 57 is inserted between two of the front members and behind the shutter. Once the back has been closed and the knob turned to expose the film, the camera is in position to take a picture.

Cameras of this type, of course, are time cameras and the shutter must be opened for a few seconds' time, depending upon the light and other circumstances involved.

The segment 16 has two depending legs 60 and 61 which fold in under the face of the camera to limit the motion of the shutter 36. In other words, the shutter 36 operates between the legs 60 and 61 to avoid excess motion. Since the shutter has a cut-out portion defining a leg 62 it is only necessary for it to move the width of the said leg.

While I have shown a specific form of my invention, certain modifications and changes may be made without departing from its spirit, and I do not wish to be limited to the specific form shown.

I claim:

1. A camera formed of one piece of material foldable upon itself to form bottom, top and side walls and a back section, a portion of said material defining film holding means within the body of said camera, an opening in the side wall of said camera aligned with one of said film holding means, an opening in the back section aligned with said first mentioned opening, a sliding member having a key-hole opening so positioned that when moved in one direction the larger portion of said key-hole opening coincides with the first two mentioned openings, a film operating member having a recessed portion extending through all three openings and locked in place when the sliding member is moved so that the smaller portion of said key-hole opening is in a line with the first two mentioned openings and engaging said recessed portion of the film operating member so that the side wall and the back section are locked in place.

2. A camera formed of one piece of foldable material defining bottom, top and side walls, a back section hinged thereto to close the rear of said camera and to cover the major portion of the inside of said side walls, means on one of the side portions of said back section to support a film spool, an opening in one of said side walls and a corresponding opening in the other side wall of said back section, a side member movably mounted in said side section having a key-hole opening therein, a film operating member comprising a knob and a key engaging the opposite end of said spool, said film operating member extending through said openings in the side walls and back section and through said key-hole slot, said film operating member having a recessed portion to be engaged by said key-hole slot when said slot member is moved downwardly to hold said film operating member in position and to lock said back section in place.

JACOB FRIED.

References Cited in the file of this patent

UNITED STATES PATENTS

| Number | Name | Date |
|---|---|---|
| 2,323,009 | Claudot et al. | June 29, 1943 |